(12) United States Patent
Austen (10) Patent No.: US 10,221,837 B2
(45) Date of Patent: Mar. 5, 2019

(54) DYNAMIC ANTI-BUCKLING SUPPORT FOR A LONG SLENDER MEMBER WITH A HIGH AXIAL COMPRESSION STRESS STATE AND CHANGING LENGTH

(71) Applicant: Alfred R. Austen, Bath, PA (US)

(72) Inventor: Alfred R. Austen, Bath, PA (US)

( * ) Notice: Subject to any disclaimer, the term of this patent is extended or adjusted under 35 U.S.C. 154(b) by 430 days.

(21) Appl. No.: 14/709,952

(22) Filed: May 12, 2015

(65) Prior Publication Data

US 2015/0330370 A1    Nov. 19, 2015

Related U.S. Application Data

(60) Provisional application No. 61/992,302, filed on May 13, 2014.

(51) Int. Cl.
*F03G 7/06*      (2006.01)

(52) U.S. Cl.
CPC ............... *F03G 7/065* (2013.01); *F03G 7/06* (2013.01)

(58) Field of Classification Search
CPC ... B21C 23/008; B21C 23/205; B21C 23/218; F03G 7/06; F03G 7/065
USPC .......................................................... 60/527
See application file for complete search history.

(56) References Cited

U.S. PATENT DOCUMENTS

| | | | |
|---|---|---|---|
| 3,724,336 A | 4/1973 | Fuchs | |
| 8,534,108 B2 | 9/2013 | Austen | |
| 8,959,970 B2 | 2/2015 | Austen | |
| 2013/0239565 A1* | 9/2013 | Browne | F03G 7/065 60/527 |

* cited by examiner

*Primary Examiner* — Mark Laurenzi
*Assistant Examiner* — Jason Sheppard
(74) *Attorney, Agent, or Firm* — Design IP (57) ABSTRACT

Apparatus and method for supporting an elongated slender member having a high axial compression stress state during a change in length of the member.

1 Claim, 6 Drawing Sheets

DYNAMIC ANTI-BUCKLING SUPPORT FOR A LONG SLENDER MEMBER WITH A HIGH AXIAL COMPRESSION STRESS STATE AND CHANGING LENGTH

BACKGROUND OF THE INVENTION

A unique process such as shown in U.S. Pat. No. 8,534,108 has become available for axially compressing shape memory alloy [SMA] wire to provide new and compact work output devices. The process is capable of plastic axial compression of continuous wire lengths in the martensitic phase causing it to elongate when heated to induce a phase transformation into the austenitic parent phase. In contrast, typically shape memory wire has been trained by stretching deformation in the martensitic phase so that it shortens when heated into the austenite phase. As a result, a new category of applications using axially compressed SMA wire in the form of super-elastic springs and SMA actuators has come into use. A long slender member such as a rod or wire (hereafter referred to as a wire) which is in a state of high axial compression stress and is changing in length without lateral structural support is subject to bending due to elastic instability (hereafter referred to as buckling). Thus, in these applications in which a portion of the wire must be free to axially expand and contract outside of the stationary lateral support provided for the wire and this portion of the wire will be called, "dynamic length". Providing lateral support for the "dynamic length" portion of the wire results in the combined use of "dynamic anti-buckling support" with "a state of high axial compression stress" and "changing in length" applied to a "portion of the length of a long slender member (wire)". Examples where all of these conditions exist simultaneously have not been reported in prior art except for those that were shown to exist in Austen U.S. Pat. No. 8,959,970, Method and Apparatus for Applying Uniaxial Compression Stressed to a Moving Wire. The only example in which these conditions exist are:

The shortening "changing in length" of "portion of the length of a long slender member, such as a shape memory wire, while it is in a state of high axial compression stress" caused by its: (a) being forcibly compressed in length in the martinsite state; or (b) being forcibly compressed in length in a compression test or forming (forging) operation while using "dynamic anti-buckling support" to prevent buckling.

One example of prior art is U.S. Pat. No. 3,724,336A by Fuchs in which dynamic anti-buckling support is provided for a long slender extrusion die ram with a high axial compression stress state, but a portion of the length of the ram does not change in length. This patent is directed to a collapsible feed mechanism for advancing and retracting a rod or rod like member which may be subjected to large compressive axial loads. This patent used a plurality of aligning plates "slidably" mounted in a support frame and they are articulated to maintain uniform spacing;

In Austen U.S. Pat. No. 8,959,970, Method and Apparatus for Applying Uniaxial Compression Stressed to a Moving Wire, paragraphs 0064 through 0070, a portion of the length of a long slender member, e.g. a shape memory metal wire experiences a changing length due to a high axial compression stress. However, the dynamic anti-buckling support is provided by a novel gripping action obtained by pressing the wire into a groove in the periphery of a moving wheel that push the wire into an anti buckling array of guide rollers that are positioned along an arc shaped path. There are few if any similarities of this method and apparatus to those of the invention described below in the present application;

There is a need of a means to provide lateral, anti-buckling support that accommodates the changing length of a wire segment while in a state of high axial compression stress. This change in length may be due to the wire elastically or plastically deforming with large (longitudinal) axial strains, the wire may be being pushed through a die in semi-continuous open die extrusion or be in other applications in which these conditions occur.

SUMMARY OF THE INVENTION

This invention provides the means to prevent buckling (bending in a state of elastic instability) of a long slender member that: (a) is simultaneously in a high axial compression stress state and (b) is subject to changing in length. The invention provides sufficient lateral support in configurations that change in shape to accommodate the changing wire length. This lateral support must be: (a) continuous along the "dynamic length" or (b) very closely spaced and provide rigid constraining support to prevent the wire from bending in any direction over the dynamic length. It is the purpose of this invention to provide means for dynamic anti-buckling lateral support. These means are called "Dynamic Anti-buckling Lateral Supports". The following five primary variations of these means are described:

Dynamic anti-buckling lateral support using inter-sliding arms to provide lateral support to the wire portion that is changing in length relative to any portion of the wire within the stationary support channel.

Dynamic anti-buckling lateral support using a collapsing cage to support the wire portion that is changing in length relative to any portion of the wire within the stationary support channel.

Dynamic anti-buckling lateral support of the wire that is changing in length while in an axial compression stress state using a stationary confining tube or channel in combination with a moving, rigid load transfer pin to apply force to the wire.

Dynamic anti-buckling lateral support of the wire using a set of closely spaced, rigidly guided sliding washers.

Dynamic anti-buckling, multiple push-pull type, folded shape memory alloy (SMA) wire pack actuator using a housing for lateral support.

In addition to the descriptions of the above variations of the dynamic anti-buckling lateral support means, descriptions of how they may be used in different applications will be set out below.

BRIEF DESCRIPTION OF THE DRAWINGS

The foregoing summary, as well as the following detailed description of the invention, will be better understood when read in conjunction with the appended drawings. For the purpose of illustrating the invention, there is shown in the drawings certain embodiments of the present invention. It should be understood, however, that the invention is not limited to the precise arrangements and instrumentalities shown. In the drawings:

FIG. 3b is a sectional view along line A-A of FIG. 3a;

DETAILED DESCRIPTION OF THE INVENTION

Figure 1A:
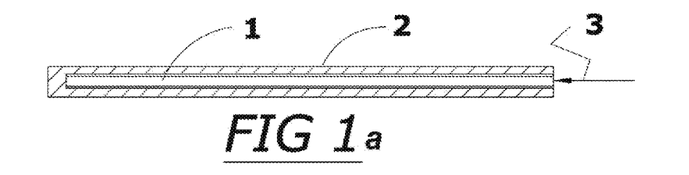
FIG. 1a is an illustration of a wire in a tubular anti-buckling support.
Figure 1B:
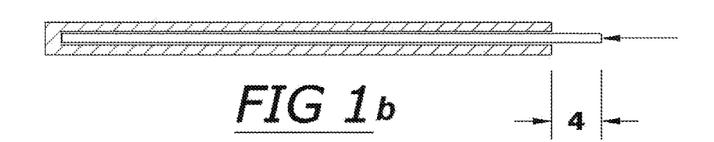
FIG. 1b is an illustration of changes in length of the wire of FIG. 1a after heating to extend outside the support.

As an application example for this invention, most commonly, Shape Memory Alloy (SMA) wire is used in tension or bending deformation as super-elastic spring members or temperature change induced Austenite-Martensite transition actuators. There are applications which can benefit from using the wire in axial compression instead of tension. In axial compression stress, most of the length of the wire can be laterally supported (such as by using a confining tube or regularly spaced supports) to prevent buckling, but some portion of the wire must be free to extend and contract outside of the stationary lateral support and this portion of the wire will be called, "dynamic length". "Stationary" designates that point along the wire that is changing in length does not move relative to the dimensionally unchanging stationary lateral support means. FIG. 1 provides a schematic illustration of the term, "dynamic length". In FIG. 1a, the Wire 1 is confined inside the bore of a Tube 2 so that the tube bore provides lateral support to prevent buckling caused by the high axial compression stress in the wire due the Axial Force represented by arrow 3. However, if the Wire 1 is a shape memory alloy (SMA) that has been compressed in the Martensite state and has been heated to above the Austenite transformation temperature—the Wire 1 will grow in length pushing against the Axial Force 3 and exit the stationary lateral support tube by a portion shown as Length 4 as shown in FIG. 1b. This Length 4 which is in a state of high axial compression stress and is changing in length so it is subject to buckling and is called the "Dynamic Length".

Figure 2A:
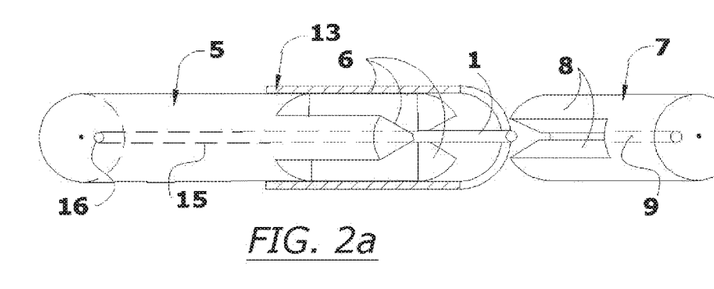
FIG. 2a is a schematic representation of the components of an example of dynamic anti-buckling lateral support using inter-sliding arms to support the wire.
Figure 2B:
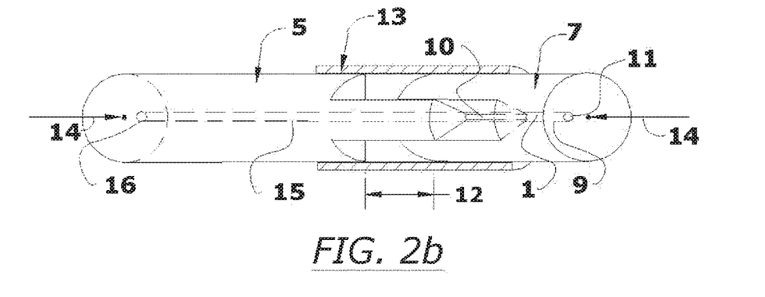
FIG. 2b is a schematic representation of the device of FIG. 2a in the assembled form.

Providing dynamic anti-buckling support may take on one of five forms, each of which may be selected depending on which offers the most cost effective solution to the supporting the Dynamic Length for a particular application and they are:

Inter-Sliding Arms Type Wire Anti-Buckling Support Description:

As shown in FIGS. 2a and 2b, the slender member (wire 1 for example) is supported from buckling by two cylindrical members 5, 7 with center line bores that have a clearance fits to wire 1 and each have three inter-sliding arms 6, 8 that can slide one relative to another, with minimal clearance between them, such that these arms will provide lateral support to the wire having high axial compression stress to prevent the wire from buckling. Each member must have at least two arms and preferably three arms or most preferably four arms or more.

The two members 5, 7 are first shown separated in FIG. 2a and then shown assembled to provide the dynamic anti-buckling device in FIG. 2b. The bore 9 does not extend through member 7, so the end of wire 1 abuts the "bottom" of bore 9 which is indicated as position 11 in FIG. 2b so that member 7 can be used to exert a force 14 on the wire causing a high axial compression state in the wire. An optional outer Sleeve 13 may be used to support the inter-sliding arms 6, 8 from becoming misaligned or bending outward.

The two members 5, 7 are first shown separated in FIG. 2a and then shown assembled to provide the dynamic anti-buckling device in FIG. 2b. The bore 9 does not extend through member 7, so the end of wire 1 abuts the "bottom" of bore 9 which is indicated as position 11 in FIG. 2b so that member 7 can be used to exert a force 14 on the wire causing a high axial compression state in the wire. An optional outer Sleeve 13 may be used to support the inter-sliding arms 6, 8 from becoming misaligned or bending outward. Sleeve 13 shown in FIGS. 2a and 2b may be replaced by multiple rings.

Figure 3A:
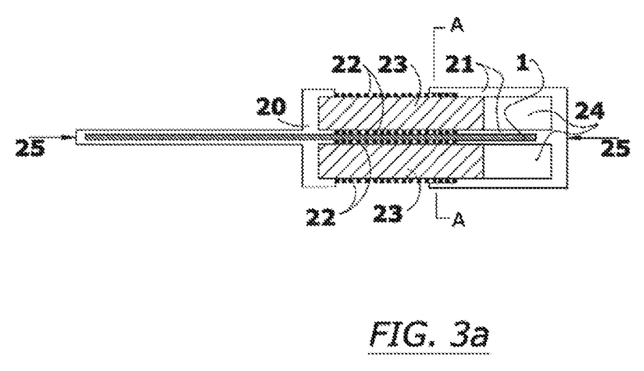
FIG. 3a is a schematic cross sectional representation of an example of dynamic anti-buckling lateral support using a collapsing cage to support the wire.
Figure 3B:
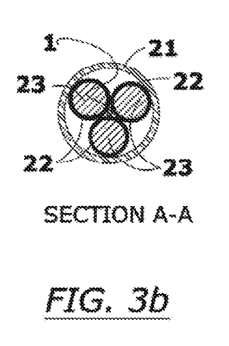

Collapsing Cage Type Wire Anti-Buckling Support Description:

In FIG. 3a and FIG. 3b, the slender member (Wire 1 for example) is supported from buckling inside the bore of a stationary housing 20, the short bore in a movable head 21 and by a circumferential array of three coil springs 22 and core rods 23 elements surrounding the wire and contacting the wire periodically. By moving the Head 21 toward the housing 20, the core rods 23 slide into the close fitting cavities 24 causing springs 22 to be compressed in length such that the wire is axially compressed and shortened in length.

Similarly, the wire will be supported if the wire is under high axial compression stress due to: (a) having been elastically compressed or (b) having been axially deformed in the Martensitic state so it will expand when transformed into the Austenitic state—the wire can elongate and push head 21 away from the housing 20 without buckling. Furthermore, allowing the wire to pass through heads 21 and housing 20 so that it is firmly held by grips abutting heads 21 and housing 20, this support device can be converted into a semi-continuous axial compression tool for compressing unlimited lengths of wire.

Figure 4:
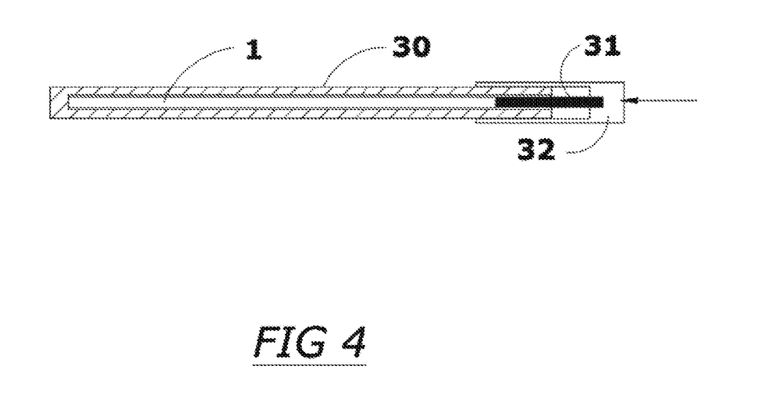
FIG. 4 is a schematic representation of an example of dynamic anti-buckling lateral support using a confining tube in combination with a rigid load transfer pin to support the wire.

Buckling Resistant Load Transfer Pin Description:

In cases where the axial compression load is relatively low and/or the Dynamic Length is relatively short, the whole Wire 1 can remain within the Stationary Lateral Support 30 and a sufficiently (very) high strength and stiff Load Pin 31 shown in FIG. 4 may enter the support tube and be a substitute for the otherwise exposed portion of Wire 1 that would be subject to buckling. The buckling resistant Load Pin 31 may be seated in a movable Cap 32 which provides rigid support and guidance to the Load Pin 31.

Figure 5:
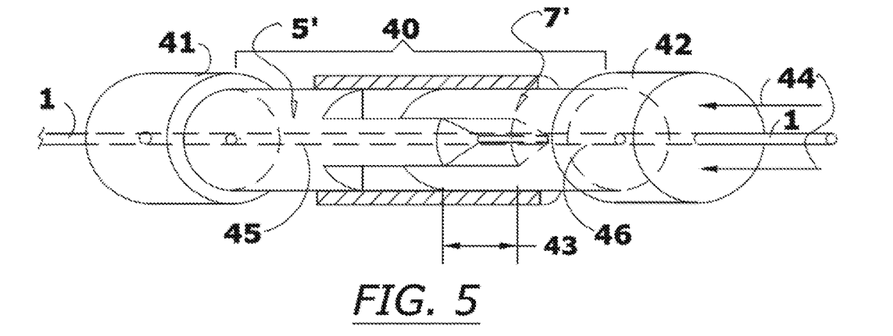
FIG. 5 is a schematic representation of the invention applied to semi-continuous compression processing of an unlimited length of wire.

Application of Inter-Sliding Arms Type Wire Anti-Buckling Support to Semi-Continuous Compression of an Unlimited Length of Wire Description:

In FIG. 5, the Inter-sliding Arms Type Wire Anti-buckling Support, shown in FIG. 2, may be used to create an apparatus for Semi-continuous Compression of an Unlimited Length of Wire. This apparatus is created by modifying the device shown in FIG. 2 with the addition of through holes 45, 46 in components 5' and 7' to allow a wire 1 to pass through the device along its axis. Proprietary non-marring wire grips 41 and 42 are added at each end of the anti-buckling support device. By extending the Anti-buckling Support Device to its maximum Operating Stroke 43 and by gripping the Wire with both Grips 41 and 42 and then with Grip 41 held stationary and by applying Force 44 against Grip 42 to reduce the length of the Operating Stroke 43, the Wire between the grips can be axially compressed without buckling. This operation would be useful for applying compression deformation to SMA wire in its Martensitic state. In the next operation, the grip on the Wire is released; the Anti-buckling Support Device is extended to its maximum Operating Stroke 43 and a new section of Wire is advanced into the Anti-buckling Support Device. The Wire axial compression operation can then be repeated using the aforementioned operating sequence. By repeating the operating cycles described above, the semi-continuous compression deformation of an unlimited length of wire can be achieved.

As a variation, the Collapsing Cage Type Wire Anti-buckling Support shown in FIG. 3 may be substituted for the Inter-sliding Arms Type Wire Anti-buckling Support to create the apparatus for Semi-continuous Compression of an Unlimited Length of Wire.

Figure 6:
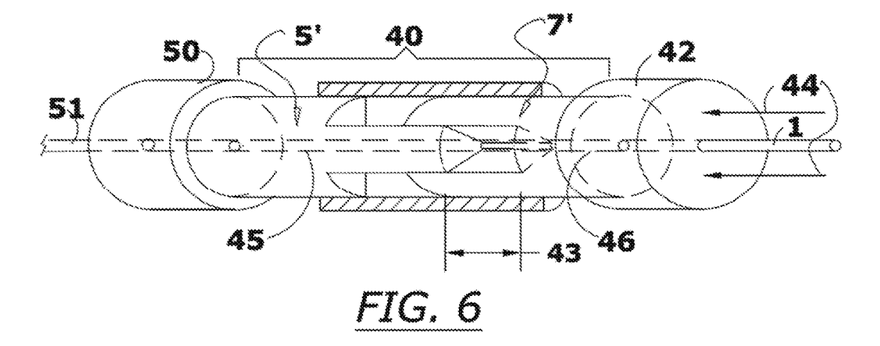
FIG. 6 is a schematic representation of the application of inter-sliding arms type wire anti-buckling support to semi-continuous open die extrusion of an unlimited length of wire.

Application of Inter-Sliding Arms Type Wire Anti-Buckling Support to Semi-Continuous Open Die Extrusion of an Unlimited Length of Wire Description In FIG. 6, the Inter-sliding Arms Type Wire Anti-buckling Support, shown in FIG. 5, may be used to create an apparatus for Semi-continuous Open-die Extrusion of an Unlimited Length of Wire. This apparatus is created by modifying the device shown in FIG. 5 with the addition of through holes 45, 46 in components 5' and 7' to allow a Wire 1 to pass through the device along its axis. A proprietary non-marring wire grip 42 is added at one end of the anti-buckling support device. A wire extrusion die 50 is positioned adjacent to the other end and rigidly supported. By extending the Anti-buckling Support Device to its maximum operating stroke 43 and by gripping the wire with proprietary grip 42 and then by applying force 44 to push the length of wire by the amount of the operating stroke 43, the wire between the grip 42 and the extrusion die 50 can be axially compressed and a portion extruded through extrusion die 50 to create a corresponding portion of extruded wire 51. In the next operation, the grip on the wire is released; the Anti-buckling Support Device is extended to its maximum operating stroke 43 and a new section of wire advanced into the Anti-buckling Support Device. The wire open die extrusion operation can then be repeated using the aforementioned operating sequence. By repeating the operating cycles described above, the semi-continuous extrusion deformation of an unlimited length of wire can be achieved.

As a variation, the Collapsing Cage Type Wire Anti-buckling Support shown in FIG. 3a and FIG. 3b may be substituted for the Inter-sliding Arms Type Wire Anti-buckling Support to create the apparatus for Semi-continuous Open-die Extrusion of an Unlimited Length of Wire.

Figure 7:
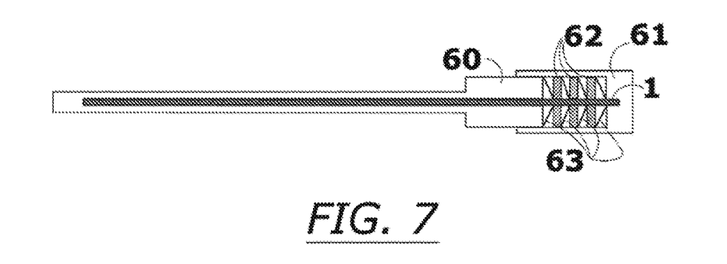
FIG. 7 is a schematic representation of Sliding Washers Anti-buckling Support.

Sliding Washers Anti-Buckling Support Description:

In FIG. 7, the majority of the length of wire 1 is supported in the stationary support tube 60 with the dynamic length protruding through a set of guide washers 62 into a receiving cavity in guide cap 61. The anti buckling support guide washers 62 are spaced apart uniformly with Belleville disc type spring washers 63 so as guide cap 61 is pushed toward support tube 60 the spring washers 63 collapse allowing the gaps between guide washers 62 to be reduced so the dynamic length of protruding Wire 1 is subjected to high axial compression stress and is reduced in length without buckling. Instead of Belleville disc type spring washers, Wave Disc or Finger Disc springs may be used. To work properly, the guide washers 62 must slide against the wire 1 and guide cap 61 wall with low friction drag and the spring constant of the spring washers 63 must be high enough to overcome friction drag and keep the spring washers 63 uniformly spaced.

Figure 8A:
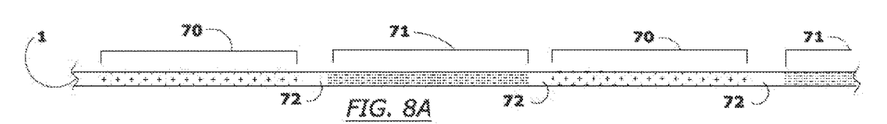
FIG. 8a is a schematic representation of how a SMA wire is prepared for use in a Non-buckling, Multiple Push-Pull, Folded SMA Wire Pack Actuator Design.
Figures 8B, 8C, 8D:
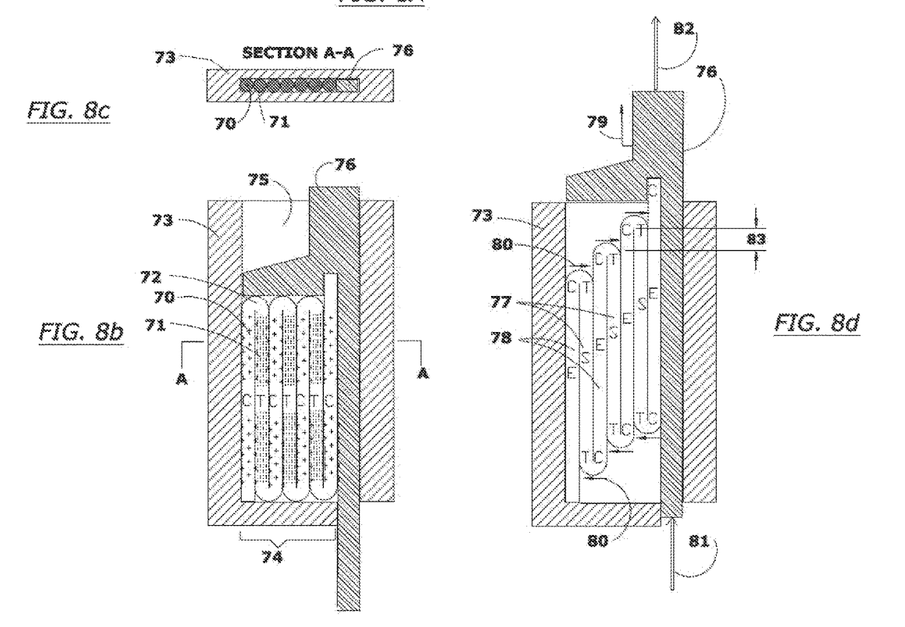
FIG. 8b is a schematic cross sectional representation of a Non-buckling, Multiple Push-Pull, Folded SMA Wire Pack Actuator Design.
FIG. 8c is a section taken along line A-A of FIG. 8b.
FIG. 8d is a schematic cross sectional representation of FIG. 8b shown with the Folded SMA Wire Pack transformed into the Austenite state to actuate the device.

Non-Buckling, Multiple Push-Pull, Folded SMA Wire Pack Actuator Design:

A major increase of the transformation response reaction stroke can be achieved without increasing the length of the actuator device by folding alternately tension and compression deformed SMA Martenite wire shown in FIGS. 8a and 8b into a configuration shown in FIG. 8b such that the elongation and shortening responses of alternate portions of the SMA wire add together upon transformation to Austenite as shown in FIG. 8d.

Regularly spaced segments of an annealed SMA wire 1 in FIG. 8a have been alternately deformed in axial compression 70 and axial tension 71 in the Martensite state that are separated by un-deformed short spans of annealed wire 72. This alternate deformation of wire 1 in axial compression 70 and axial tension 71 can be performed using the apparatus shown in FIG. 5 and described in Section titled, Application of Inter-sliding Arms Type Wire Anti-buckling Support to Semi-continuous Compression of an Unlimited Length of Wire Description. However, instead of repeated cycles of axial compression deformations, alternate tension and compression deforms cycles will be performed. In addition, alternatively, any other apparatus that can perform semi-continuous axial compression operation on wire may be operated in a modified manner to perform the above described alternate compression and tension deformation operation.

The wire shown in FIG. 8a is then bent "back and forth" on itself in a single plane at the annealed wire locations 72 to form a wire pack 74 of alternately arranged lengths of tension and compression deformed SMA wire. This wire pack 74 is then inserted into a close fitting, rectangular shaped cavity 75 in rigid housing 73 along with plunger 76 as shown as a Folded SMA Wire Actuator in FIGS. 8b and 8c.

The actuation behavior of the Folded SMA Wire Actuator is shown in FIG. 8d with the alternate elongation of formally compressed wire segments 70 into elongated wire segments 78 and the alternate contraction of formally stretched wire segments 71 into shortened wire segment 77. The absolute value of these transformation deformations add together to move plunger 76 relative to housing 73 as indicated by arrow 79 shown in FIG. 8d such that it can provide a pulling action indicated by arrow 81 and/or a pushing action indicated by arrow 82.

The elongated wire segments 78 may be subjected to high axial compression stress which could cause buckling if not supported from bending. The close fitting side walls of cavity 75 support the wire segments 78 over their full lengths and the close packing of wire segments 78 with wire segments 77 supports the wire segments 78 where in contact. Only short sections such as 83 of wire segments 78 remain unsupported by a contact surface, but the bending moments depicted by arrows 80 resulting from compression (C) and tension (T) stresses in the wires adjacent to the bend causes the "exposed" section 83 to tend to bend against an adjacent wire contact surface for lateral support. Thus, the relatively short length of section 83 and its tendency to bend against a wire contact support surface creates an anti-buckling design. Alternate methods for attaching the ends of the wire segments 77,78 such as by welding or mechanical attachment may be used.

The embodiments of the invention from the above drawing geometries in schematic representations clearly show the primary features and were not of the relative scale that would be used in the actual devices.

Also, the wire anti-buckling devices were shown at the end of the whole assembly at which the external force responsible for the compression stress was applied. Actually, the anti-buckling device may be at the opposite end from where the external force responsible for the compression stress was applied. Alternatively, the anti-buckling device may be anywhere along the wire path in the assembly. Furthermore, the wire path may be nonlinear to better conform to the application. In all applications there will be some sliding contact of the wire against a stationary surface which may require lubrication. In the event of high contact pressure, especially in applications having nonlinear wire path, stationary lateral support channel surfaces may be covered or coated with lubricating bearing materials and/or non-wearing materials.

Example 1

Example 1 represents a semi-continuous, open die wire extrusion application that was configured in a manner similar to that shown in FIG. 6 but with several differences. The assembly 40 is in FIG. 6 is replaced by the device shown in FIG. 9. The hollow cylinder section sections, 5' and 7' shown in FIG. 6 that are contiguous with inter-sliding arms 6 and 8 shown in FIG. 2a and act to position the inter-sliding arms relative to one another were replaced by external rings 91 and 92 that are attached to the inter-sliding four arm sets 93 and 94 and secured to the rings with screw sets 95 and 96 as shown in the photograph, FIG. 9. The mechanical support function of the sleeve 13 shown in FIG. 2a is provided by the rings 97 and 98 which also act to position the inter-sliding arms relative to one another.

Figure 9:
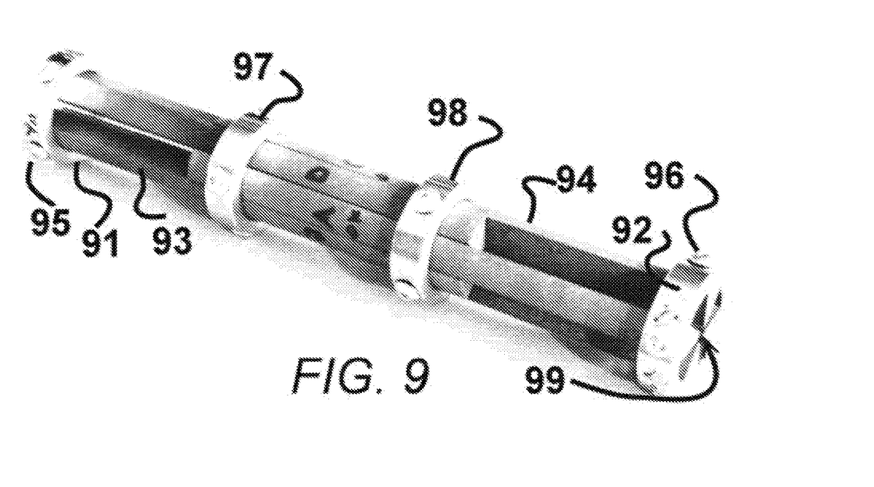
FIG. 9 is a perspective view of a device fabricated in accord with the present invention.

The anti-buckling device shown in FIG. 9 was fabricated by first boring a No. 10 drill size (0.1935") axial hole in the center of a 6" long, 1.0" diameter, 1144 alloy steel bar stress-relieved to minimize warping during machining. The sixteen, 8-32 NF threaded holes were added to the arms for the support ring attachment and then the bar was sliced longitudinally with four 0.012" wide slots made by wire EDM to produce the eight, inter-sliding arms used in the device in this example. The four external rings were fabricated from ⅜" wide sections of 1.375" OD by 1.00" ID low carbon steel tube and drilled with four fastener holes each and used to produce anti-buckling device shown in FIG. 9. Two additional sets of external rings were produced and with ID measurements of 1.010" and 1.020" for use in expanding the anti-buckling device bore 99 range by 0.010" and 0.020" in diameter respectively.

The anti-buckling device shown in FIG. 9 was used in open die extrusion trials conducted with a custom designed and fabricated extrusion press frame to reduce rods by open die extrusion as summarized in the following table:

| Material | Initial Diameter, Inches | Final Diameter, Inches | Extruded Length per Pass | No. of Passes | Total Length Extruded |
|---|---|---|---|---|---|
| Phosphorus - Copper Alloy | 0.188 | 0.169 | 3.5" | 2 | 7" |
| 18200 Cu over 0.050 NiTi Core | 0.190 | 0.178 | 3.0" | 2 | 6" |
| 18200 Cu over 0.047 NiTi Core | 0.178 | 0.169 | 3.5" | 2 | 7" |
| 18200 Cu over 0.045 NiTi Core | 0.169 | 0.161 | 3.5" | 2 | 7" |
| ⅛" Copper rod inside a .188" OD by 0.125 ID steel coil spring | 0.125 | 0.117 | 3.6" | 1 | 3.6" |

In the above trials, the extruded lengths were used as "leaders" for subsequent gripping and drawing of the remaining un-extruded portions of the rods through the extrusion die to reduce the full length of the rod to the extruded leader diameter.

The use of various ID and OD size coil springs coupled with the adjustable bore 99 of the anti-buckling device allows the one unit to be used to support a large variety of rod diameters.

In the extrusion press apparatus, a ring geometry adaptor was used to center one end of anti-buckling device on the extrusion die while the rod inside the anti-buckling device centered the other end of the device on the non-marring grip used to push the rod through the die.

Example 2

The anti-buckling device of Example 1 may be adapted for use in the axial compression of shape memory alloy (SMA) wire described in paragraphs [0033] through [0035]. In contrast to open the open die extrusion example, the extrusion die is replaced with a second wire grip so the section of wire between the grips and inside the anti-buckling device can be subjected to an axial compression stress determined by the applied compression force as shown in FIG. 5. In order to laterally support a relatively small, 0.050 inch diameter SMA wire made of Nitinol to be axially compressed, the wire will be inside a 0.053 ID by 0.125" OD super-elastic material tube the length of the axially expanded length, for example 9.0 inches, of the anti-buckling device. The super-elastic tube will be inside a 0.125" ID by 0.188" OD coil spring which in turn will be inside the 0.188" diameter bore of the anti-buckling device. This arrangement will be referred to as "the anti-buckling device assembly" in further discussion. By clamping the SMA wire between non-marring grips, the Nitinol wire can be plastically deformed in axial compression in the martensitic state by forcing the non-marring grips toward each other while causing the anti-buckling device to shorten in length and correspondingly, elastically deforming the coil spring and super-elastic wire support tube accordingly. After the wire has been plastically deformed in axially compressed state, the grips can be released, the anti-buckling device length restored and a new section of SMA wire advanced into the anti-buckling device assembly to begin another SMA wire axial compression cycle for a semi-continuous operation.

Figure 10:
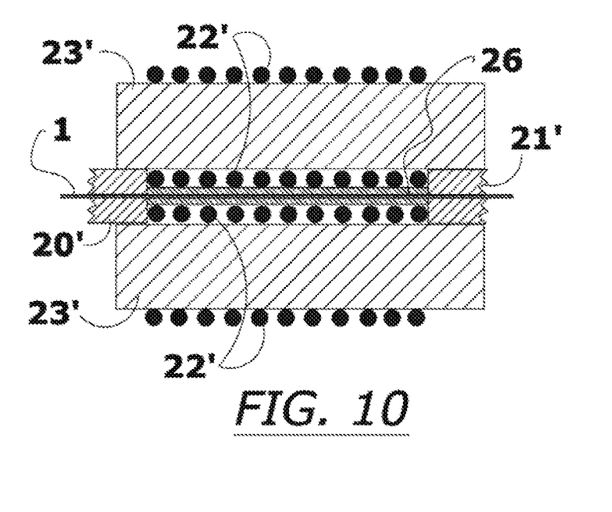
FIG. 10 is a schematic representation of a device according to the invention including a super-elastic tubular wire lateral support sleeve.

Fabrication of the apparatus as illustrated in FIGS. 3(a) and 3(b) for wire that is smaller than 1 mm in diameter becomes more challenging as the wire diameter becomes yet smaller. To manage this problem, a super-elastic tubular sleeve 26 can be placed around the wire 1 in the deformation zone as shown in FIG. 10 which shows a portion of FIG. 3. This elastically axially deforming sleeve can laterally support the wire from buckling under high axial compression stress while allowing it is being compressed in length. In a manner similar to the anti-buckling collapsing cage support operation described in above, the super-elastic sleeve 26 is supported by a circumferential array of three coil springs 22' and core rods 23' elements surrounding the sleeve and contacting the sleeve periodically. By moving the Head 21' toward the housing 20', the core rods 23' slide into the close fitting cavities causing springs 22' to be compressed in length such that both the super-elastic sleeve 26 and the wire 1 are axially compressed and shortened in length. Similarly, the wire will be supported if the wire is under high axial compression stress due to: (a) having been elastically compressed or (b) having been axially deformed in the Martensitic state so it will expand when transformed into the Austenitic state. Furthermore, allowing the wire to pass through heads 21' and housing 20' such that it is firmly held by grips abutting heads 21' and housing 20', this support device can be converted into a semi-continuous axial compression tool for compressing unlimited lengths of wire.

The use of a super-elastic sleeve to support axial compression forming of wire can be readily adapted to work with the inter-sliding arms anti-buckling support described in paragraph [0040] and illustrated in FIG. 5. In this case, the super-elastic sleeve will be supported from bending by the support arms and in turn provide anti-buckling support for the small diameter wire passing through it.

Figure 11:
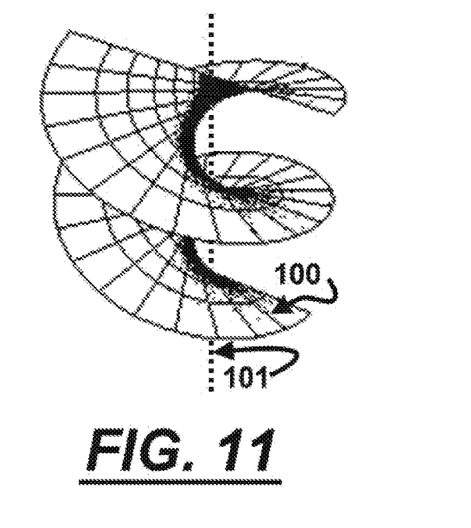
FIG. 11 is an illustration of helicoid surface used to define component geometry.

A useful variation of the Inter-sliding Arms Type Wire Anti-buckling Support Device described in paragraphs above is to fabricate the inter-sliding arms in a curved configuration so that they twist around the wire they support with a helical geometry such that the matching surfaces of the arms are in the form of a helicoid surface 101 as shown in FIG. 11. The wire path will follow the axis 101. The helicoid is the only non-rotary surface which can glide along itself so that the sets of inter-sliding arms will rotate relative to each other as they move apart or together. Thus, devices and applications using this form of anti-buckling device impart both linear displacement and rotation simultaneously. The relationship of the linear and angular displacements will be controlled by the pitch of the helicoid geometry.

In addition to the applications mentioned in the Descriptions, these devices have the following additional uses:
  Supporting a SMA wire with a high axial compression stress while it is being extended and/or being compressed in actuator device applications.
  Facilitating large axial deformations of super-elastic wire with a high axial compression stress while it increases or decreases in length.
  Facilitate axial compression testing of relatively long sections of wire.
  Co-acting with wire grips to semi-continuously apply axial compress strain a superconductor composite wire to introduce strains that cause pinning defects for improved superconducting performance.

The invention claimed is:
1. A method for providing lateral, anti-buckling support of a long slender member supported in a stationary lateral support, wherein a dynamic support system supports a portion of the dynamic length of said long slender member free to extend and contract outside of the stationary laterally supported portion of said long slender member to accommodate a change in length of the long slender member while said member is in a state of high axial compression stress, comprising the steps of:
  selecting said dynamic support system from one of an inter-sliding arms wire support, collapsing cage wire support, buckling resistant load transfer pin, super-elastic sleeve, or a combined guide washer and collapsible assembly of sliding washer support; and
  installing the selected support system in relation to a portion of said member undergoing a change in length.

* * * * *